US010408625B2

(12) United States Patent
Lee

(10) Patent No.: US 10,408,625 B2
(45) Date of Patent: Sep. 10, 2019

(54) VISION-ASSIST SYSTEMS WITH ROOM SCANNERS TO DETECT AND NOTIFY USERS OF OUT-OF-ORDER ROOM STATES

(71) Applicant: Toyota Motor Engineering & Manufacturing North America, Inc., Erlanger, KY (US)

(72) Inventor: Christopher P. Lee, San Jose, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 162 days.

(21) Appl. No.: 15/132,860

(22) Filed: Apr. 19, 2016

(65) Prior Publication Data
US 2017/0299394 A1   Oct. 19, 2017

(51) Int. Cl.
G06K 9/00 (2006.01)
G01C 21/20 (2006.01)
G09B 21/00 (2006.01)

(52) U.S. Cl.
CPC ....... G01C 21/206 (2013.01); G06K 9/00671 (2013.01); G09B 21/006 (2013.01)

(58) Field of Classification Search
None
See application file for complete search history.

(56) References Cited

U.S. PATENT DOCUMENTS 3,800,082 A    3/1974  Fish
5,666,157 A    9/1997  Aviv et al.
8,091,782 B2   1/2012  Cato et al.
8,370,030 B1*  2/2013  Gurin .................. B60R 1/00
                                              180/272
8,606,316 B2   12/2013 Evanitsky
9,036,028 B2   5/2015  Buehler
2004/0143498 A1* 7/2004 Umeda .................. G06Q 30/02
                                              705/14.1
2005/0035862 A1* 2/2005 Wildman .............. A61B 5/1113
                                              340/573.1

(Continued)

OTHER PUBLICATIONS

Hillary Bruebeck, "Watch Nissan's New Self-Driving Office Chair in Action"; Fortune.com; http://fortune.com/2015/02/17/nissan-self-driving-chair/; dated Feb. 17, 2016; accessed Apr. 26, 2016.

Primary Examiner — Jonathan M Dager
Assistant Examiner — Garrett F Evans
(74) Attorney, Agent, or Firm — Dinsmore & Shohl LLP

(57) ABSTRACT

Vision-assist systems that inform visually impaired users regarding the current state of a room are disclosed. In some embodiments, a system includes an image sensor for obtaining a baseline image of the room including one or more items in the room positioned in an in-order state, and memory to store the baseline image. The system may include a motion sensor to detect when the user is approaching the room to activate the image sensor to obtain a real-time image of the room. A detection module determines whether the room and items in the room are in an in-order state or an out-of-order state when compared with the baseline image, and an output module notifies the user of the current state of room. In this manner, a visually impaired user can be informed of the state of a room which thereby aids the user in navigating or moving within the room.

19 Claims, 9 Drawing Sheets

(56) References Cited

U.S. PATENT DOCUMENTS

| | | | |
|---|---|---|---|
| 2005/0099318 A1* | 5/2005 | Gilfix | G09B 21/001 340/4.14 |
| 2008/0170118 A1* | 7/2008 | Albertson | A61H 3/061 348/46 |
| 2011/0316695 A1* | 12/2011 | Li | G01S 5/02 340/539.13 |
| 2012/0092502 A1 | 4/2012 | Knasel et al. | |
| 2013/0300729 A1* | 11/2013 | Grimaud | G06Q 10/087 345/419 |
| 2014/0086124 A1* | 3/2014 | Knowles | H04W 52/0277 370/311 |
| 2014/0192259 A1* | 7/2014 | Holz | H04N 5/23241 348/372 |
| 2016/0078642 A1* | 3/2016 | Nigg | G06Q 10/0633 345/632 |
| 2016/0189499 A1* | 6/2016 | Allen | G08B 13/19604 382/103 |
| 2016/0195856 A1* | 7/2016 | Spero | G06N 5/046 700/90 |
| 2016/0342863 A1* | 11/2016 | Kwon | G06K 9/4647 |
| 2017/0076571 A1* | 3/2017 | Borel | G08B 13/19669 |
| 2017/0262724 A1* | 9/2017 | Wu | G06K 9/3233 |

* cited by examiner

| ROOM CONDITION | EMPTY TRAINED ROOM (FIG. 6A) | ENTERED/OCCUPIED ROOM (FIG. 6B) | VACATED ROOM (FIG. 6C) | |
|---|---|---|---|---|
| OCCUPANCY | NO | YES | NO | |
| ORDERED | YES | DEPENDS ON LOCATION OF ITEMS | NO - CURRENT IMAGE DOES NOT MATCH TRAINED IMAGE | YES - CURRENT AND TRAINED IMAGES MATCH |
| INDICATOR | OFF | ON INDICATES OUT-OF-ORDER; OFF INDICATES IN-ORDER | ON INDICATES FORGOTTEN ITEM OR OUT-OF-ORDER STATE | OFF INDICATES IN-ORDER/ NOTHING LEFT BEHIND |
| RESULT | "IDLE" | "WELCOME"/BEGIN SCANNING FOR ROOM STATE AND INDICATE ROOM STATE | NOTIFY USERS OF ISSUES | RETURN TO "IDLE" (FIG. 6A) |

FIG. 7

VISION-ASSIST SYSTEMS WITH ROOM SCANNERS TO DETECT AND NOTIFY USERS OF OUT-OF-ORDER ROOM STATES

TECHNICAL FIELD

The present specification generally relates to vision-assist systems and, more specifically, to vision-assist systems including room scanners.

BACKGROUND

It may be difficult for a visually impaired person to determine whether a room—such as a family room, bedroom, living room or other room—has items positioned within the room in an expected, orderly manner. If items—such as furniture items—are incorrectly positioned in a room, there is a risk that the visually impaired person may bump into, or trip over, a misplaced item when entering or moving about the room. For instance, a table that has been moved from its ordinary location may present a fall risk to a visually impaired person.

Accordingly, a need exists for vision-assist systems that assist a visually impaired user with determining whether the items in a room are in-order or out-of-order and informing the user of the current state of the room.

SUMMARY

According to one embodiment, a vision-assist system for informing a visually impaired user of the current state of a room includes an image sensor for obtaining a baseline image of the room including one or more items in the room positioned in an in-order state, and a memory operatively coupled with the image sensor. The memory stores the baseline image. The vision-assist system further includes a motion sensor operatively coupled with the image sensor. The motion sensor is configured to detect when the user is approaching the room, and also to activate the image sensor to obtain a real-time image of the room. The vision-assist system also includes a detection module for determining whether the room including the one or more items in the room are in an in-order state or are in an out-of-order state when compared with the baseline image, and an output module for notifying the user of whether the room including the one or more items in the room are in an in-order state or an out-of-order state. In this manner, a visually impaired user can be informed of the state of a room which thereby aids the user in navigating or moving within the room.

According to another embodiment, disclosed herein is a vision-assist system for aiding a visually impaired user to navigate a room includes an image sensor for obtaining an image of the room including one or more items in the room positioned in an in-order state, the image sensor activated in part based on voice commands from the user. The vision-assist system further includes a memory operatively coupled with the image sensor and for storing the image. The vision-assist system also includes a detection module operatively coupled with the image sensor for obtaining a real-time image of the room including the one or more items, and determining whether a current state of the room including the one or more items in the room is in an in-order state or is in an out-of-order state, and an output module for notifying the user of the current state of the room.

According to yet another embodiment of the present disclosure, disclosed herein is a room scanner system for aiding a visually impaired user. In one example, the system may include an image sensor for obtaining an image of the room including one or more items in the room positioned in an in-order state, and a memory operatively coupled with the image sensor. The memory stores the baseline image. The vision-assist system further includes a sensor operatively coupled with the image sensor. The sensor detects when the user is approaching the room and in response, the sensor activates the image sensor to obtain a real-time image of the room. The vision-assist system further includes a detection module operatively coupled with the image sensor for determining whether the current state of the room, including the one or more items in the room, is in an in-order state or is in an out-of-order state. The vision-assist system further includes an output module for notifying the user of the current state of the room.

According to yet another embodiment of the present disclosure, disclosed herein is a vision-assist system for aiding a visually impaired user. In one example, the system may include an image sensor for obtaining an image of a room including one or more items in the room positioned in an in-order state. The vision-assist system further includes a memory operatively coupled with the image sensor. The memory stores the image. The vision-assist system further includes a sensor operatively coupled with the image sensor, the sensor detects when the user is approaching the room and in response, the sensor activates the image sensor to obtain a real-time image of the room. The vision-assist system further includes a module operatively coupled with the memory to analyze one or more locations of the one or more items in the room as captured in the real-time image and the stored image. The module determines whether a current state of the room including the one or more items in the room is in an in-order state or is in an out-of-order state. The vision-assist system further includes an output module for notifying the user of the current state of the room.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 7 illustrates an example of a state table for detecting a condition of a room or a detecting when an item has been forgotten or left-behind, according to one or more embodiments shown and described herein.

DETAILED DESCRIPTION

Embodiments of the present disclosure provide devices and methods for aiding visually impaired, low vision or blind individuals by detecting whether a room and items within the room (such as furniture, couches, tables, chairs, and other items) are "in order" or "out of order", and can indicate the state of the room to the user. As used herein, an "in order" room is a room where the items within the room are in positions or locations as desired, expected, predetermined, or previously arranged by or on behalf of the user. As used herein, an "out of order" room is a room where the items within the room are not in the positions/locations as desired, expected, predetermined, and/or previously arranged by or on behalf of by the user, and/or items are missing from the room when compared with an "in order" room state; or additional items are present in the room when compared with an "in order" room state. In this manner, embodiments of the present disclosure can aid a visually impaired person by providing them with real-time knowledge of the state of the room, which can help the visually impaired person with navigating and moving within the room. Various vision-assist systems will be described in more detail herein with specific reference to the corresponding drawings.

Figure 1:
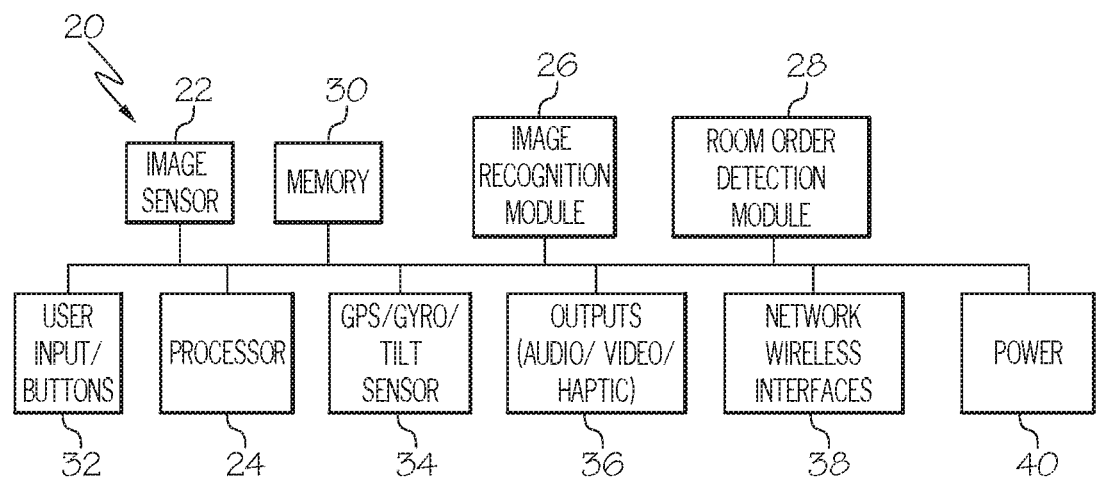
FIG. 1 schematically depicts an example of a vision-assist system including a variety of sensors and electronic components, according to one or more embodiments shown and described herein.

In one example of the disclosure, a vision assist system 20 (also referred to herein as camera device 20, room scanner device 20, device 20 or system 20) may be provided. The device 20 may be mounted or positioned within a room to take one or more images of the room and items within the room. Referring to FIG. 1, device 20 may include, in one example, an image sensor 22 which obtains digital images of the room and items of the room, operatively coupled with one or more processors 24 (such as image processors, controllers, microprocessors, digital signal processors, computing device, or other integrated circuits) which processes the digital images from image sensor 22. Image sensor 22 and processor 24 may also include various conventional lenses or focusing mechanisms. In one example, such lenses may include wide-angle lenses or fisheye lenses such that device 20 can capture, in a single image, one or more items or contents of a room, along with walls and other structural elements within a room.

Each of the one or more image sensors 22 is communicatively coupled to the one or more processors 24. Each of the one or more image sensors 22 may be any device having an array of sensing devices (e.g., pixels) capable of detecting radiation in an ultraviolet wavelength band, a visible light wavelength band, or an infrared wavelength band. Each of the one or more image sensors 22 may have any resolution, and may include omni-directional or panoramic optical elements. In some embodiments, one or more optical components, such as a mirror, fish-eye lens, or any other type of lens may be optically coupled to at least one of the one or more image sensors 22.

An image recognition module 26 may be provided which recognizes items within a room, such as furniture items (i.e., couch, tables, chairs), walls, floors, windows, and doors, etc. Image recognition module 26 may be used to identify items in a room that are of interest (such as furniture items), for purposes of determining the current state of a room.

In accordance with one embodiment of the present disclosure, a room order detection module 28 is provided which performs one or more of the operations or functions as described herein. In one example, room order detection module 28 creates a map of a room in an "in-order" state, based upon one or more images obtained of the room and the items within a room in a location as desired by the user (these one or more images may be referred to as baseline images). Room order detection module 28 may also obtain a current or real-time image of the room and the items within the room, and detection module 28 then compares the current real-time image of the room and the items against the baseline "in order" image or map of the room to determine whether the room is "in order", or "out of order." As stated above, a room may be "out of order" in situations where items are in locations in different than as desired, or items are missing from the room, or additional items are present in the room.

In one example, device 20 also includes memory 30, such as conventional persistent memory and static memory, operatively coupled with image sensor 22, image recognition module 26 and room order detection module 28.

Each of the one or more memory modules 30 may be communicatively coupled to the one or more processors 24, and may comprise RAM, ROM, flash memories, hard drives, or any device capable of storing data and/or machine readable instructions such that the machine readable instructions can be accessed and executed by the one or more processors 24. The machine readable instructions may be written to perform the functionalities described herein. The machine readable instructions may comprise logic or algorithm(s) written in any programming language of any generation such as, for example, machine language that may be directly executed by the one or more processors 24, or assembly language, object-oriented programming (OOP), scripting languages, microcode, etc., that may be compiled or assembled into machine readable instructions and stored in the one or more memory modules 30. Alternatively, the machine readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

User input 32 devices may be provided with camera device 20, for instance in the form of conventional buttons, switches, voice recognition modules for recognizing voice commands, or other mechanisms or structures to obtain user input to control device 20.

In one example, user input device 32 may include a motion sensor (such as laser scanner, a capacitive displacement sensor, a Doppler effect sensor, an eddy-current sensor, an ultrasonic sensor, a magnetic sensor, an optical sensor, a radar sensor, a sonar sensor, or the like) to sense when a person has entered or is approaching the room, which can be utilized as an event to trigger room order detection module 28, in one example. For instance, upon detecting motion of a person approaching the room, input device 32 can trigger room order detection module 28 to initiate its processes to determine whether the room is in order or out of order (see, for instance, the operations 80 of FIG. 5), and to provide notification to the person of the current state of the room.

Device 20 may also include one or more sensors, such as a GPS sensor, a gyroscope, a tilt sensor, and/or a sensor to detect a heading such as North, South, East, West. Sensors 34 may also include sensors to detect nighttime versus daytime, or a light versus dark setting, and such data may be utilized by module 28 or by device 20, such as to determine the manner in which to obtain images or the manner in which to provide information and feedback to the user about the current state of the room.

In one example, device 20 utilizes GPS location information and associates such GPS location information with the image or map formed by device 20 of the room when a baseline image is taken of the room to reflect the "in order" state of the room, or when an image is taken of the room in real-time. For instance, device 20 can determine whether device 20 itself has been moved to a different location, and if so, the movement of device 20 would affect the manner in which device 20 would determine if the items in a room are in order or out of order.

Device 20 may also include one or more output structures or modules 36, such as one or more speakers to provide audio output (such as chimes, beeps) or audible messages; lights, visible or video output indicators; and/or haptic feedback mechanisms such as vibration structures, buzzers or other output devices. In one example, haptic feedback may be wirelessly activated by output module 36 and effectuated on a haptic feedback device worn by the user or carried by the user, such as a mobile device or smart phone.

Outputs 36 in the form of lights positioned on or about device 20 may be communicatively coupled to the one or more processors 24. Each of the one or more output lights 36 may be any device capable of outputting light, such as but not limited to a light emitting diode, an incandescent light, a fluorescent light, or the like. In some embodiments, the one or more lights 36 include a power indicator light that is illuminated when the system 20 is powered on. In some embodiments, the one or more lights 36 include an in-order state, such as a green light, and an out of order state, such as red light. In some embodiments, the one or more lights 36 include an illumination light for illuminating the room when the room is otherwise dark. Some embodiments may not include the one or more lights 36.

Device 20 may also include one or more communication interfaces 38, such as wired or wireless network interfaces (Wi-Fi or Bluetooth or Ethernet). In one example, output module 36 is operatively coupled with wireless interface 38 to generate and send one or more electronic messages regarding the current state of the room to a mobile device (such as a smartphone or other device) that may be carried by the visually impaired user. In one example, system 20 is operatively coupled over a wireless interface 38 with the remote electronic device, such as but not limited to a mobile phone, a smartphone, a personal digital assistant, a camera, a dedicated mobile media player, a mobile personal computer, a laptop computer, and/or any other remote electronic device capable of being communicatively coupled with the system 20. In some embodiments, the remote electronic device may perform one or more elements of the functionality described herein, such as in embodiments in which the functionality described herein is distributed between system 20 and the remote electronic device. In some embodiments, the remote electronic device may provide a user interface through which one or more settings or configurations of system 20 may be altered (e.g., the ability to turn feedback on or off, adjusting the frequency of feedback, adjusting the type of feedback, etc.). In other embodiments, system 20 is not communicatively coupled to a remote electronic device.

The network interface hardware 38 may be communicatively coupled to the one or more processors 24, and may include a communication transceiver for sending and/or receiving any wireless (or wired) communication. For example, the network interface hardware 38 may include an antenna, a modem, LAN port, Wi-Fi card, WiMax card, mobile communications hardware, near-field communication hardware, satellite communication hardware and/or any wired or wireless hardware for communicating with other networks and/or devices. In some embodiments, the network interface hardware 38 includes hardware configured to operate in accordance with the Bluetooth wireless communication protocol. In other embodiments, the network interface hardware 38 includes hardware configured to operate in accordance with a wireless communication protocol other than Bluetooth, such as Ethernet and/or wireless technologies such as, for example, Wi-Fi. Suitable personal area networks may include wireless technologies such as, for example, IrDA, Wireless USB, Z-Wave, ZigBee, and/or other near field communication protocols, or cellular network technologies such as LTE, WiMAX, UMTS, CDMA, and GSM; or wired technologies such as, for example, USB and FireWire, or any other conventional communications protocols.

Power structures 40 provide electrical power to device 20, and may take on any known or yet-to-be developed power source (e.g., the electrical grid, locally generated power such as solar, and battery power). For example, one or more batteries may each be electrically coupled to the various electrical components of system 20. Each of the one or more batteries may include a rechargeable battery, such as a lithium-ion battery or a nickel-cadmium battery, and system 29 may include the one or more charging ports, each of which may be used to charge the one or more batteries. The power structures may be operated in a low-power mode, a battery backup mode, or other conventional power cycling modes.

The components of device 20 may be coupled together as shown in FIG. 1 over any conventional medium that is capable of transmitting a signal such as, for example, conductive wires, conductive traces, optical waveguides, and buses that cooperate to permit the transmission of electrical data signals to such components such as processor(s) 24, memories 30, sensors 34, input devices 32, output devices 36, and communication devices 38. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. As used herein, the term "communicatively coupled" or "operatively coupled" means that coupled components are capable of exchanging data signals with one another such as, for example, electrical signals via conductive medium, electromagnetic signals via air, optical signals via optical waveguides, and the like.

It should be understood that the components of the system 20 may be distributed among a variety of physical modules, each of which are communicatively coupled via a wireless network or a wired network.

Device 20 may be positioned within a room in various manners. In one example, device 20 may be mounted to a wall or ceiling of the room, and in another example device 20 may be positioned or affixed to a tabletop surface or other surface within the room. In another example, device 20 may be positioned on a floor. Device 20 may be enclosed within a secure housing.

Figure 2:
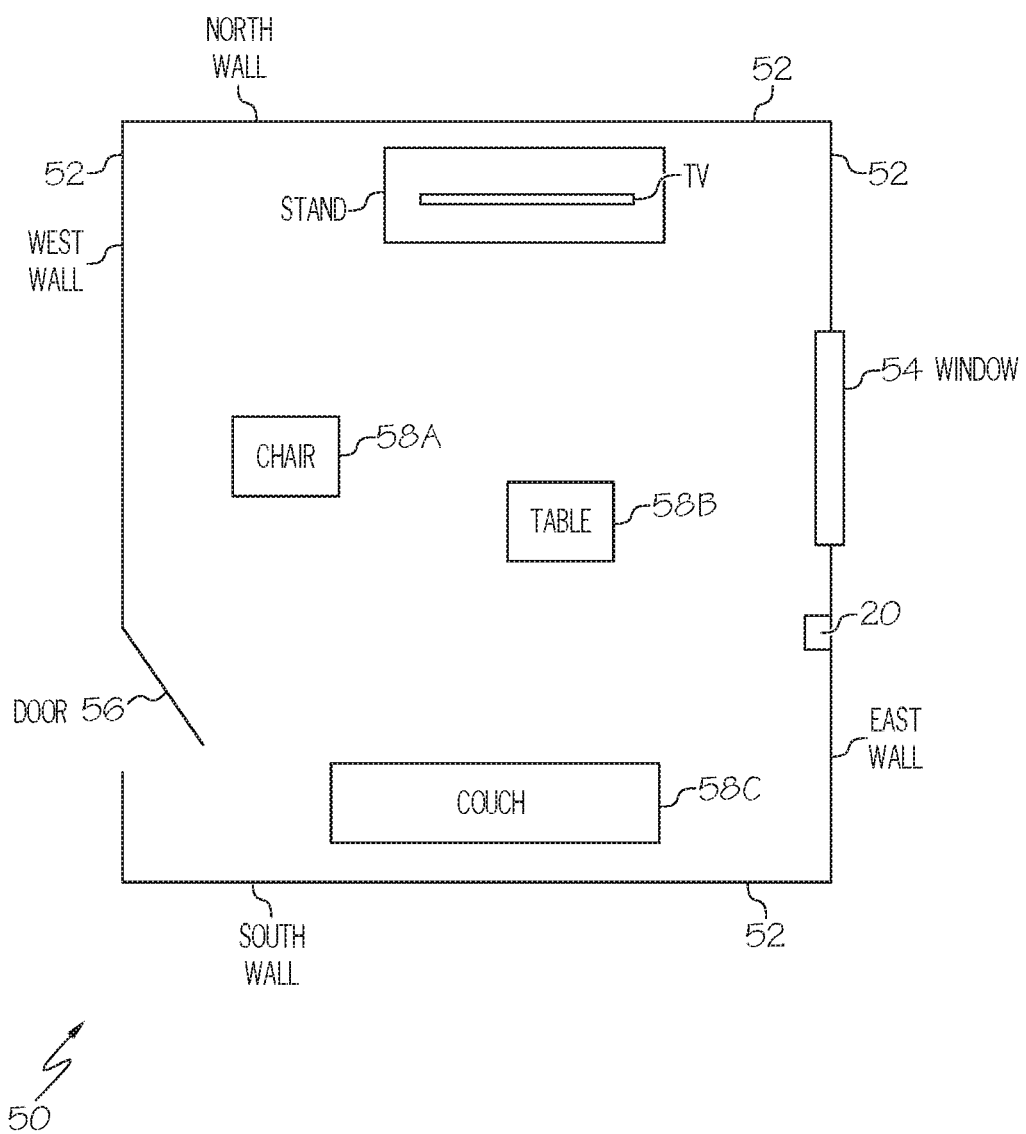
FIG. 2 illustrates an example of a map of a room and items within a room, in an "in order" state, according to one or more embodiments shown and described herein.

FIG. 2 illustrates an example of an "in-order" room 50 and items within the room that are in desired locations/positions as determined by a user. In one example, device 20 is positioned on a wall of room 50 and device 20 obtains an image of the room 50, and identifies walls 52, windows 54, and doors 56. For instance, device 20 may identify, in one example, a North wall, a South wall, a West wall, and an East wall. In this manner, device 20 can establish a baseline image or frame of reference of the items within room 50 with respect to the walls, doors and/or windows of the room 50. Device 20 may also process the image of room 50 in order to identify objects such as furniture items, including but not limited to chair 58A, table 58B, couch 58C and television stand 58D in this example. Module 28 of device 20 can determine the relative location of the items 58 within room 50, relative to fixed structures such as walls 52, windows 54, and doors 56. In one example, module 28 forms a map of the desired locations of items 58 within room 50 based on one or more images that device 20 has taken of room 50 when the room is in an "in order" state.

Figure 3:
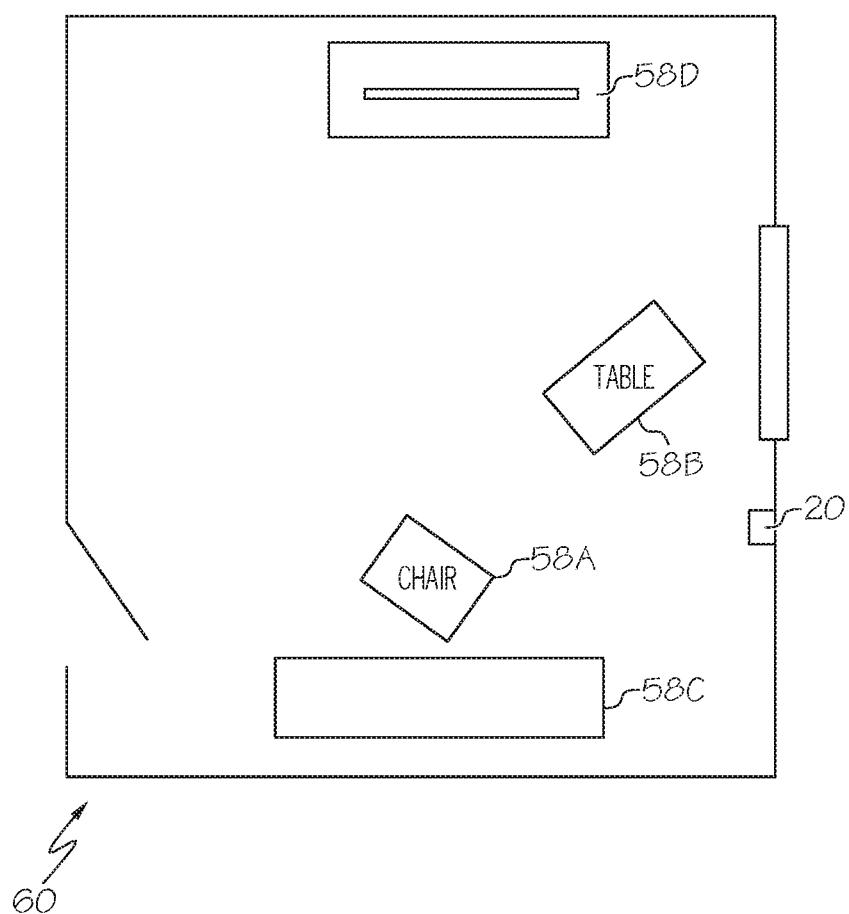
FIG. 3 illustrates an example of a map of a room and items within a room, in an "out of order" state, according to one or more embodiments shown and described herein.

FIG. 3 illustrates an example of an "out-of-order" room 60 where items within the room are in locations that differ from the locations of such items when compared with FIG. 2. Note that in this example of FIG. 3, device 20 remains positioned on the wall in the same location as in FIG. 2.

In the example illustrated by FIG. 3, while couch 58C and television stand 58D are in their correct locations, module 28 determines that chair 58A and table 58B are not in their correct locations when compared with their respective locations in FIG. 2, and accordingly, room 60 is "out of order." Device 20 would then notify a user accordingly.

While in FIGS. 2-3, device 20 is shown as being attached to and positioned on a wall within a room, it is understood that device 20 could be positioned on and/or attached to other locations such as on a ceiling, on a table, on a floor or other surface. In some embodiments, device 20 may be configured as a wearable device that is capable of being worn by the user. As a non-limiting example, device 20 may be configured as a necklace configured to be worn around the neck of a user.

Figure 4:
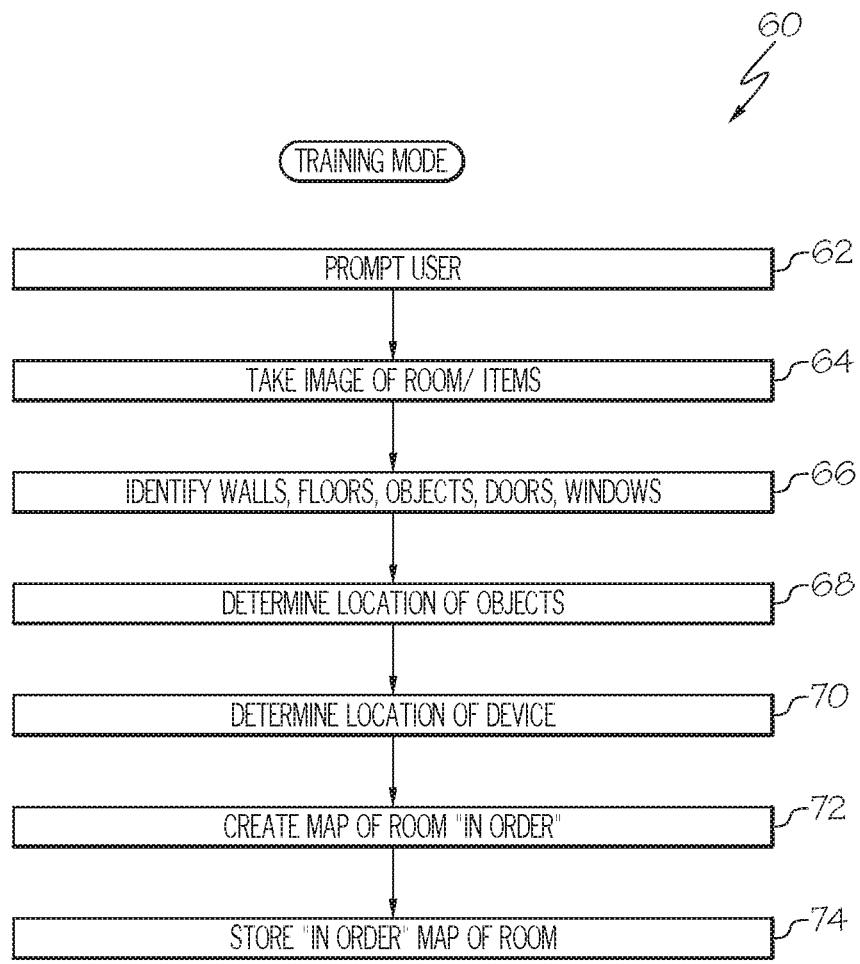
FIG. 4 schematically depicts a flowchart of an example of a method of establishing a map of a room in an "in order" state, according to one or more embodiments shown and described herein.
Figure 5:
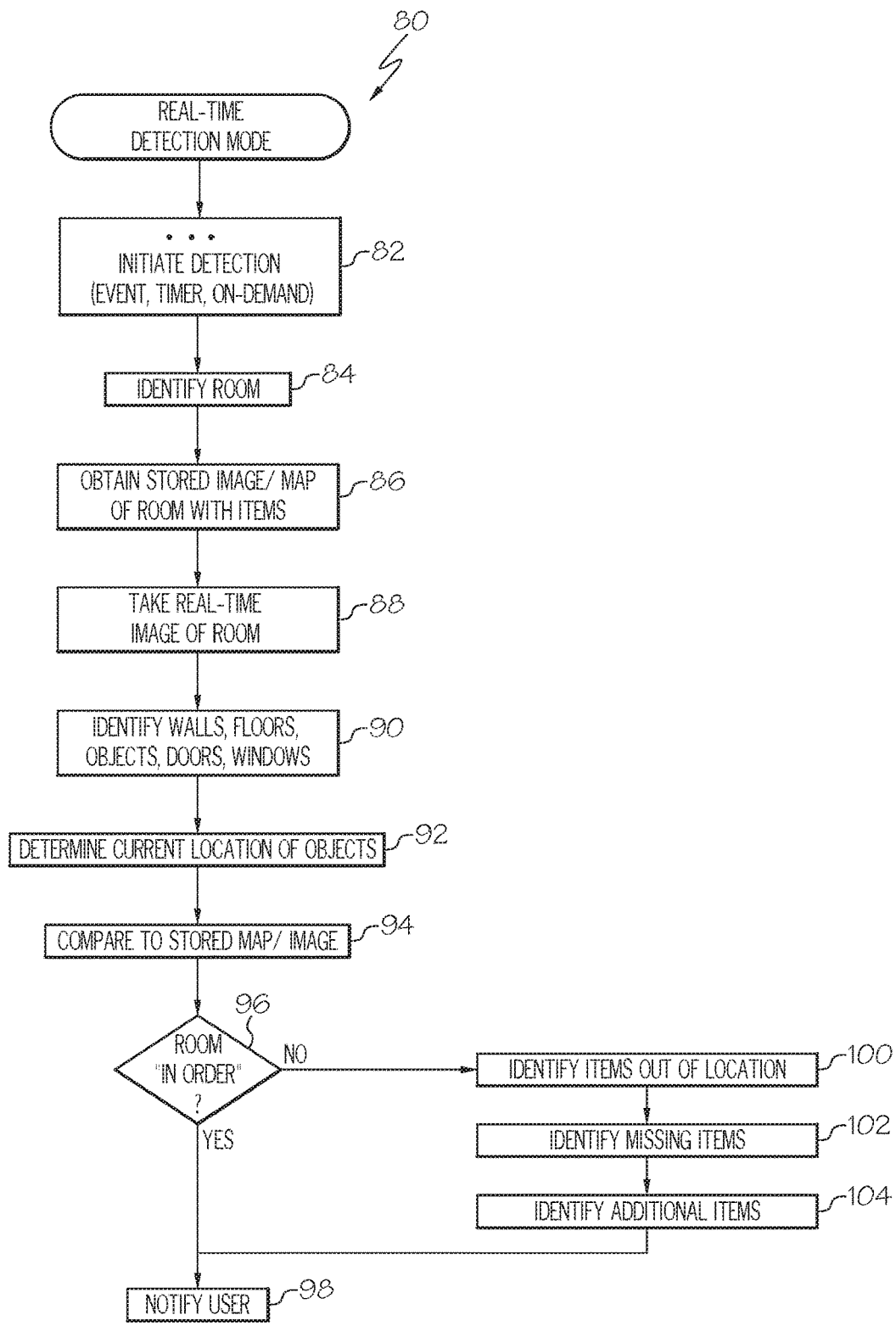
FIG. 5 schematically depicts a flowchart of an example of a method of determining whether a room is currently in an "in order" state or an "out of order" state and notifying a user accordingly, according to one or more embodiments shown and described herein.

FIGS. 4-5 illustrate various examples of operations that some embodiments of device 20 may perform, depending upon the particular implementation. In FIG. 4, examples of operations 60 relating to training some embodiments of device 20 are illustrated by obtaining an image of a room and associated items in an "in-order" state. In FIG. 5, example operations are illustrated for detecting, in real time, whether a room is in an "in-order" state or out of order state, in accordance with some embodiments of the present disclosure.

In FIG. 4, in one example of the present disclosure, at operation 62 a user may be prompted to initiate a training mode of device 20 if the user desires. The prompt may be, in one example, an audio message or other form of messaging to the user or notification indicating that training mode is being initiated. The initiation of a training mode may be initiated by a user command, for instance, by a user pressing a button or issuing a voice command to device 20, or by other conventional input control. The prompt may in indicate to the user to place the device 20 in a desired location within the room, for instance, on a fixed location on the wall or ceiling of the room.

At operation 62, the prompt may also include an indication to the user that the room should be arranged in an in-order state, with all of the items in the room (such as chairs, tables, couches, etc.) in their desired position prior to the image of the room is being taken at operation 64.

At operation 64, one or more images of the room are obtained by device 20. In one example, the one or more images may include one or more walls and floor of the room, with other fixed items in the room such as one or more windows, doors, or other fixed items, as well as other items that are present within the room such as but not limited to chairs, tables, couches, other furniture items and/or other items.

Upon obtaining the one or more images of the room at operation 64, operation 66 identifies various objects in the room such as walls, floors, doors, windows, and other objects. In one example, operation 66 utilizes conventional or yet-to-be-developed image processing techniques and databases for object identification that can identify various standard items such as furniture items or other items within the room as desired.

At operation 68, the location of the various objects identified at operation 66 are determined. In some embodiments, operation 68 determines distances between the outer periphery of each of the objects identified operation 66, and may determine the midpoint or centerpoint of each of the objects identified by operation 66 as well as their location within the room.

At operation 70, the location of the device 20 is determined. In one example, the device utilizes GPS location data to determine the location of the device 20 at the time that operation 64 was performed with respect to obtaining an image of the room. In this manner, operation 70 can be utilized to provide GPS location data to store and associate the location of device 20 with the baseline image of the room when the room is in an "in order" state. In some embodiments, location data may be manually entered into device 20.

Other sensor data may also be utilized by operation 70, such as tilt sensors, gyroscope, and/or magnetometer data. For instance, operation 70 may determine various headings with respect to device 20, such as the direction of North, South, East, West.

At operation 72, a map of the room may be created based on the baseline image of the room obtained at operation 64, and the data obtained by operations 66-70 with respect to the location of various objects and reference points within the room. The map of the room created by operation 72 reflects the location of the objects within the room when the room is in an "in order" state. At operation 74, the map of the room is stored for later use.

Hence, it can be seen from the example operations illustrated by FIG. 4 can provide device 20 with formulation of an "in order" map of the room with the items in the room positioned as desired by the user. If the user decides to change or alter the location of objects within the room in a different desired manner, the operations of FIG. 4 can be repeated to form an updated map of the room in a new "in order" state. If desired, the user may configure two or more "in order" states of a room, such as for example, a "first in order" state and a "second in order" state—and device 20 can alert the user as to whether the room is in the first in order state or the second in order state, if desired. In embodiments, device 20 may also store information relating to multiple rooms, if desired.

In FIG. 5, operations 80 illustrate examples of operations for real-time detection of whether a room is currently in an "in order" state or an "out of order" state, in accordance with one embodiment of the present disclosure. These operations may be implemented by device 20 in some embodiments.

At operation 82, detection of the state of the room is initiated. In one example, the detection operations may be initiated on based on various occurrences—such as based on a periodic timer, the occurrence of one or more events, or may begin on demand or request by a user. For instance, the detection operations may begin upon device 20 determining that a user or person is approaching or entering the room. As mentioned above, device 20 may be provided with a motion sensor or motion detector which can be utilized, when triggered, to initiate operation 82.

In another example, device 20 may be provided with the ability to respond to voice commands or user input, such as button presses, messages, or wireless signals. Upon detection of such user input, operation 82 may be initiated.

In another example, a periodic timer can initiate detection of the state of the room. For instance, device 20 can initiate detection of the state of the room upon a periodic timer expiring (i.e., every 60 seconds although it is understood that other periodicities can be used), and upon detecting that the room is out-of-order, device 20 provides a notification (i.e., sounds an alarm and/or sends a user a message) indicating that the room is out of order (see operation 98 in FIG. 5, described below).

At operation 84, the room is identified. The room may be identified by device 20 through the use of GPS location data, or other data indicating which room camera device 20 is positioned within. At operation 86, a stored image/map of the room (i.e., baseline image) with the items in an "in order" state is obtained. In one example, operation 86 retrieves the stored image/map of the room from one or more persistent memory of device 20. The stored image/map may be, for instance, the result of operation 74 of FIG. 4. The obtained stored image/map of the room includes the items within the room in an "in order" state, with the items within the room being in positions as desired by the user. At operation 88, a real-time image of the room is obtained. In one example, device 20 takes an image of the room in its current state.

At operation 90, objects within the room are identified. In one example, objects, walls, floors, doors, windows, and other items may be identified using image processing to distinguish between the various items of the room as reflected in the real-time image from operation 88.

At operation 92, the current location of objects within the room is determined. In one example, operation 92 determines the relative distance between the perimeters of the objects within the room, and in some embodiments, the distances between the midpoints of the objects within the room are determined by operation 92. Operation 92 may also determine the location or distance of the objects relative to fixed items within the room, such as the distance between objects and walls, doors, or windows.

At operation 94, the real-time locations of objects from operation 92 are compared against the locations of objects as reflected within the stored image/map of the room from operation 86 in an "in order" state.

Operation 96 determines whether the room is in an "in order" state or an "out of order" state. If operation 96 determines the room is in order, then operation 98 may notify the user that the room is "in order". In one example, operation 98 could utilize an audible tone, a visual signal, haptic feedback, or a combination thereof, to indicate to the user that the room is "in order."

If, however, operation 96 determines that the room is not "in order" then control is passed to operation 100. There may be various conditions or situations which operation 96 detects which are indicative of an "out of order" state. For instance, in some embodiments, operation 100 may identify that items within a room are out of location or in an incorrect position or orientation—and therefore the room is "out of order." In another example, operation 102 may identify that items within the room are missing—and therefore the room is "out of order." In another example, operation 104 may determine if there are additional items in the room which are not part of an "in order" room—and therefore the room is not "in order." In some embodiments of the present disclosure, if one or more of these conditions are detected and operation 96 determines that the room is "out of order," control is then passed to operation 98, which would notify the user that the room is in an "out of order" state using an audible signal, visual indicators, haptic feedback, or any combination thereof. In embodiments, the parameters defining what is an "in order" room as opposed to an "out of order" room may be set by the user. For example, a user may program device 20 such that a particular object within the room may be moved but the room should still be considered to be "in order." As another example, the user may define tolerances for the location of specific objects such that when a specific object is moved beyond the defined tolerance, the room may be considered "out of order." As a non-limiting example, the user may program device 20 such that a table may be moved from the set location in any direction by one half meter and the room may still be determined to be "in order" by device 20. If the particular table is moved more than one half meter in any direction, the room may be determined to be "out of order" by device 20.

Accordingly, it can be seen that FIG. 5 provides real-time detection of whether a room is in an "in order" state or an "out of order" state, and notifies the user of such state of the room. In this manner, a visually impaired user can be notified in real-time as to whether items in a room are in expected locations or positions, which can thereby assist the visually impaired user as the user enters the room.

Hence, in some embodiments, a visually impaired user can control the camera device 20 using voice commands. Device 20 can be configured to automatically detect (for instance, using motion detection) when the user approaches the room and in response, device 20 can scan the room and audibly or otherwise notify the visually impaired user as to whether the room is currently in-order or out-of-order. In this manner, device 20 can be configured to automatically inform a visually impaired user of the current state of a room.

In another embodiment, a determination of the state of a room can be based on a comparison of images of the room, for instance a comparison between a baseline image of the room when the room and the items in the room are positioned in an "in-order" arrangement; against a current or real-time image of the room. In this example, operations 66-72 of FIG. 4 and operations 84, 90-92 of FIG. 5 can be omitted in one implementation. If the baseline image and the real-time image substantially match, then the room may be considered "in-order"; and if the images do not substantially match, the room may be determined to be out-of-order. The tolerances as disclosed herein can be utilized in determining whether the room is currently in-order or not.

In another embodiment as shown in FIGS. 6A-6C and FIG. 7, device 20 can be configured to detect whether an item (such as item 114 in FIG. 6C) has been left behind in a room, and device 20 can provide notifications to a user that an item has been left behind. For instance and without limitation, device 20 could detect if a person left behind an item 114 such as but not limited to a notebook, smart phone, coffee mug, briefcase, or any other item.

Notifications of one or more left-behind items can be provided using audio signals, light, messaging (e.g., text messages, emails, or other messaging), haptic feedback, or using other indicators. In one example, notifications may be provided using a light 36 (FIGS. 6A-6C) which can be controlled by device 20.

Figure 6A:
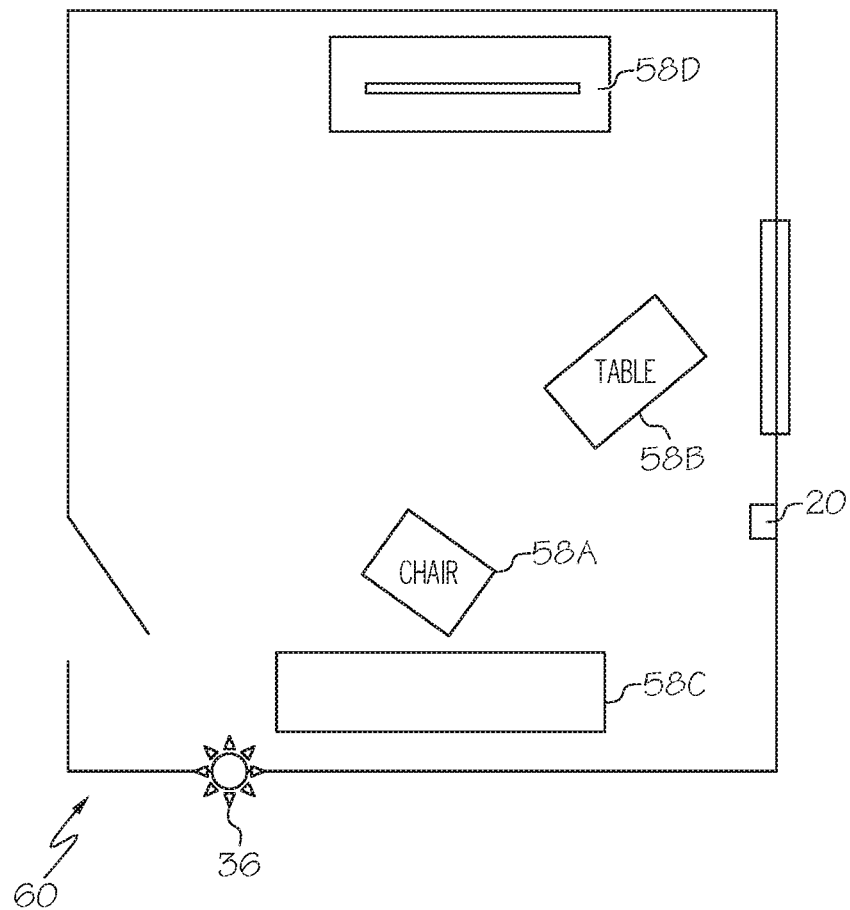
FIGS. 6A-6C illustrate examples of notifications of an out-of-order room or a forgotten item, according to one or more embodiments shown and described herein.
Figure 6B:
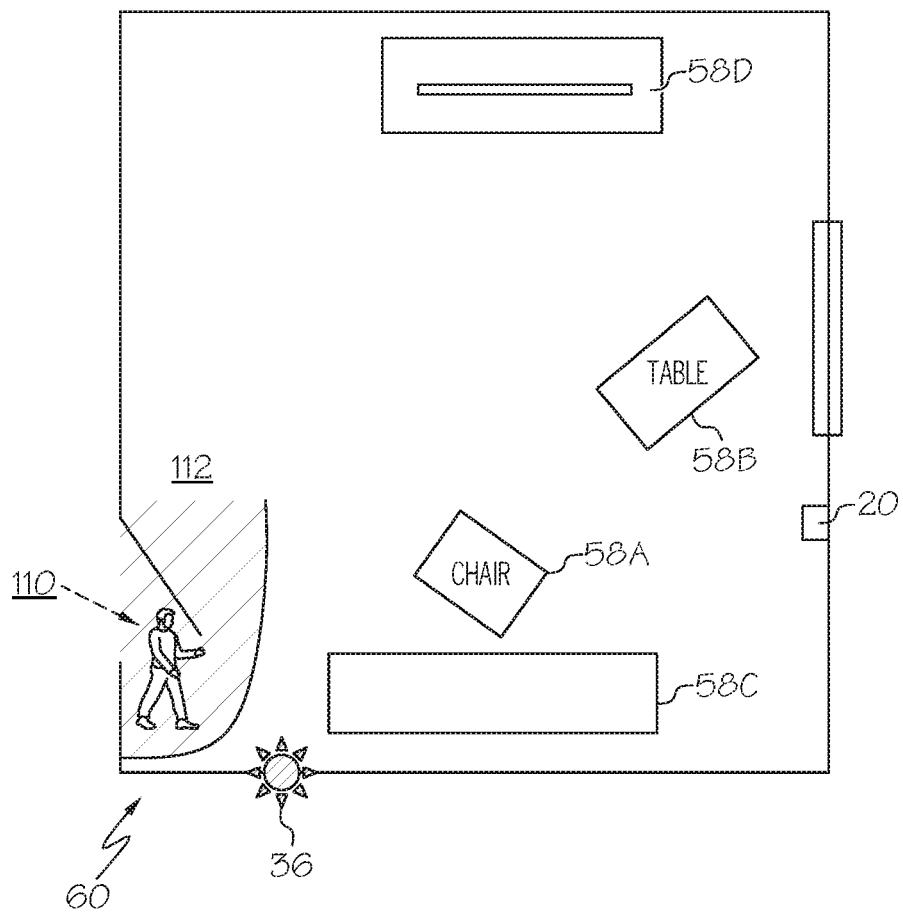
Figure 6C:
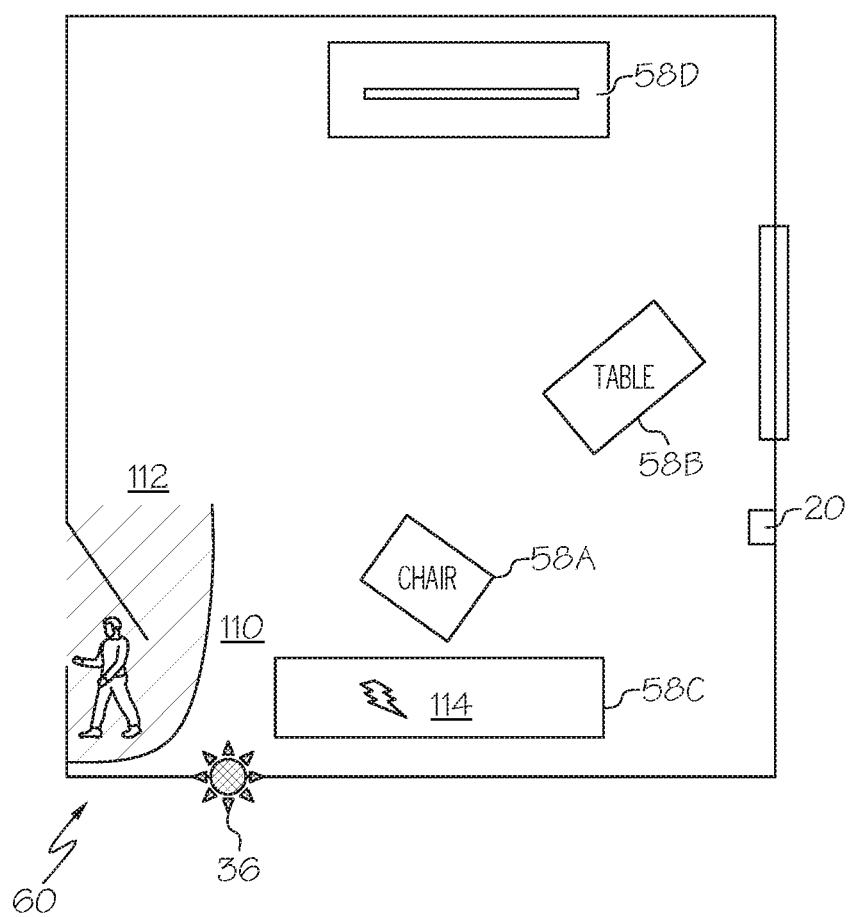

In one example and as shown in FIGS. 6B-6C and state table 120 of FIG. 7, indicator 36 when turned ON can signify various conditions such by way of example "Welcome" when persons 110 enter the room, "Scanning" when persons are occupying the room, "Out of Order" when the room is out of order, or "Forgotten Item" when an item 114 has been left behind in the room as the room becomes unoccupied. Different colors for indicator 36 can be used to indicate different conditions, and indicator 36 may use audible signals or other feedback in conjunction with visible light signals.

In one example as shown in FIGS. 6B-6C, one or more entry/exit zones 112 can be established for a room, and device 20 can monitor the entry/exit zones 112 as to whether persons are entering or exiting zones 112 in order to determine if the room is occupied or unoccupied. In one example, a counter may be utilized by device 20 to track the number of people 110 in a room, and the counter can be adjusted (i.e., incremented or decremented) when persons 110 enter or leave the room through the entry/exit zones 112. In this manner, device 20 can track whether a room is occupied or unoccupied.

Moreover, movement of persons 110 within zones 112 can be detected by device 20 and used by device 20 to trigger scanning of the room to obtain a current or real-time image of the room. As described herein, such current or real-time image(s) of the room can be compared against a baseline image of the room, to determine if the items in the room are in-order or out-of-order, or if an item has been left-behind when persons 110 leave the room.

If desired, in one example, one or more aspects of the embodiments of FIGS. 6-7 for determining whether an item 114 has been left behind can be used in conjunction with one or more aspects of embodiments that determine whether a room is in-order or out of order. In another example, a device 20 can be configured to detect whether an item 114 has been left behind in a room, and to notify of a left-behind item 114.

Referring to FIG. 7, an example of a state table 120 is depicted which can be implemented within device 20 to control notifications provided by indicator 36 as to when an item 114 is left behind in a room or when the room is out of order. In one example of state table 120, input values of "Room Condition" are tracked by device 20, as to whether the room is occupied by persons 110, and as to whether the room is in-order. An output value of "Indicator" controls whether the indicator 36 is to be turned ON or OFF in order to provide alerts to a user of the state of the room or as to a left behind item 114.

In one example, when the room is not occupied and the room is in order, then the indicator 36 can be OFF and device 20 may be in an "Idle" state awaiting the detection of activity or awaiting further input. This scenario may correspond to a room as shown in FIG. 6A.

Upon detection by device 20 of a person 110 entering the entry/exit zone 112, when the room is now occupied then device 20 may be in an "Welcome" or "Scanning" state where device 20 scans the room to detect if the room is in-order or out of order. Indicator 36 is turned ON if the room is out-of-order, and indicator 36 is turned OFF is the room is in-order. This scenario may correspond to a room as shown in FIG. 6B. As mentioned above, device 20 can maintain a counter of the number of persons 110 in the room, in the event that other persons 110 enter the room or leave the room.

Upon detection by device 20 of a person 110 exiting the room through entry/exit zone 112, when the room is no longer occupied by persons 110, device 20 determines whether the room is now in-order with no items 114 left behind, and if true, then indicator 36 is turned OFF to indicate that the room is in-order and no items have been left behind. As discussed herein, in one example, device 20 determines whether or not the room is in-order (or whether an item 114 has been left behind) by comparing a current image of the room to a baseline image of the room when the room was in-order with no additional items 114 in the room. If the current image of the room does not match the baseline image, then device 20 can turn ON indicator 36 to indicate that the room is now out-of-order or that an item 114 has been left behind in the room—as illustrated in FIG. 6C. Indicator 36 can be turned ON, and if desired, audible signals such as buzzers or tones can be played to notify a user that the room is not in-order or that an item 114 has been left behind.

Hence, it can be seen that embodiments of the present disclosure can be utilized to provide notifications to vision impaired persons and non-vision impaired persons, as to whether a room is in-order or out-of-order; and if desired, some embodiments of the disclosure can be utilized to provide notifications as to whether an item has been left behind in a room. One or more features of the disclosure can be combined depending on the particular implementation.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A wearable vision-assist system for aiding a visually impaired user to navigate a room, comprising:
   an image sensor for obtaining a baseline image of the room including one or more items in the room positioned in an in-order state, wherein the baseline image comprises a frame of reference of the one or more items in room with respect to a fixed item within the room;
   a location sensor configured to determine location data of the wearable vision-assist system;
   a memory operatively coupled with the image sensor and the location sensor, the memory storing the baseline image and location data correlated to the baseline image;
   a sensor operatively coupled with the image sensor, the sensor configured to detect when a user is approaching the room, and the sensor configured to activate the image sensor to obtain a real-time image of the room, wherein the real-time image comprises a frame of reference of the one or more items in room with respect to the fixed item within the room;

a processor coupled to the memory and the location sensor and configured to correlate the baseline image with the room based upon the location data determined by the location sensor, determine whether the room including the one or more items in the room are in an in-order state or are in an out-of-order state when compared with the baseline image, wherein the processor is configured to determine a location or distance of the one or more items relative to the fixed item from the baseline image and the real-time image; and an output device configured to provide an output signal to notify the user of whether the room including the one or more items in the room are in an in-order state or an out-of-order state, wherein the vision-assist system is configured as a mobile wearable device.

2. The vision-assist system of claim 1, wherein the image sensor includes a wide angle lens.

3. The vision-assist system of claim 1, wherein the image sensor includes a fish-eye lens.

4. The vision-assist system of claim 1, wherein the baseline image is obtained in response to an input from the user while the one or more items in the room are positioned in the in-order state.

5. The vision-assist system of claim 1, wherein the processor compares the real-time image against the baseline image.

6. The vision-assist system of claim 1, wherein the processor determines a location of the one or more items in the room from the baseline image, and the processor determines the location of the one or more items in the room from the real-time image.

7. The vision-assist system of claim 1, wherein the output device provides an audible signal to the user that the room is in an out-of-order state.

8. The vision-assist system of claim 1, wherein the output device provides a signal to the user that the room is in an out-of-order state when the real-time image indicates that the one or more items in the room are in different positions than their respective positions in the baseline image.

9. The vision-assist system of claim 1, wherein the output device provides a signal to the user that the room is in an out-of-order state when the real-time image indicates that the one or more items are missing from the room when compared with the baseline image.

10. The vision-assist system of claim 1, wherein the output device provides a signal to the user that the room is in an out-of-order state when the real-time image indicates that additional items are present in the room when compared with the baseline image.

11. The vision-assist system of claim 1, wherein the location sensor comprises a GPS unit to provide GPS position location data associated with the baseline image.

12. A wearable vision-assist system for aiding a visually impaired user to navigate a room, comprising:

an image sensor for obtaining an image of the room including one or more items in the room positioned in an in-order state, the image sensor activated in part based on received voice commands, wherein the image comprises a frame of reference of the one or more items in the room with respect to a fixed item within the room;

a location sensor configured to determine location data of the wearable vision-assist system;

a memory operatively coupled with the image sensor and the location sensor, the memory storing the image and location data correlated to the image;

a processor operatively coupled with the image sensor for obtaining a real-time image of the room including the one or more items, with the memory for accessing the image and with the location sensor for obtaining location data of the wearable vision-assist system for the real-time image and identifying the room based upon the location data determined by the location sensor for the real-time image, the processor configured to determine whether a current state of the room including the one or more items in the room is in an in-order state or is in an out-of-order state, wherein the processor is configured to determine a location or distance of the one or more items relative to the fixed item from the stored image and the real-time image; and an output device configured to provide an output signal to notify the user of the current state of the room, wherein the vision-assist system is configured as a mobile wearable device to be worn by the user.

13. The vision-assist system of claim 12, wherein the processor is activated to obtain the real-time image upon the user approaching the room.

14. The vision-assist system of claim 12, wherein the output device provides a signal to the user that the room is in an out-of-order state when the real-time image indicates that one or more items in the room are in different positions than their respective positions in the image.

15. The vision-assist system of claim 12, wherein the output device provides a signal to the user that the room is in an out-of-order state when the real-time image indicates that the one or more items are missing from the room when compared with the image.

16. The vision-assist system of claim 12, wherein the output device provides a signal to the user that the room is in an out-of-order state when the real-time image indicates that additional items are present in the room when compared with the image.

17. A wearable vision-assist system for aiding a visually impaired user, comprising:

an image sensor for obtaining an image of a room including one or more items in the room positioned in an in-order state, wherein the image comprises a frame of reference of the one or more items in the room with respect to a fixed item within the room;

a location sensor configured to determine location data of the wearable vision-assist system;

a memory operatively coupled with the image sensor and location data correlated to the image, the memory storing the image and location data correlated to the image;

a sensor operatively coupled with the image sensor, the sensor configured to detect when the user is approaching the room and in response activate the image sensor to obtain a real-time image of the room, wherein the real-time image comprises a frame of reference of the one or more items in the room with respect to the fixed item within the room;

a processor operatively coupled with the memory and configured to correlate the stored image with the room based upon the location data determined by the location sensor and to analyze one or more locations of the one or more items in the room as captured in the real-time image and the stored image and to determine whether a current state of the room including the one or more items in the room is in an in-order state or is in an out-of-order state, wherein the processor is configured to determine a location or distance of the one or more items relative to the fixed item from the stored image and the real-time image; and an output device configured to provide an output signal to notify the user of the current state of the room, wherein the vision-assist system is configured as a mobile wearable device to be worn by the user.

18. The system of claim 17, wherein the output device provides a signal to the user that the room is in an out-of-order state when the real-time image indicates that one or more additional items are present in the room when compared with the image of the room in an in-order state.

19. The system of claim 17, wherein the output device provides a signal to the user that the room is in an out-of-order state when the real-time image indicates that the one or more items are missing from the room when compared with the image of the room in an in-order state.

* * * * *

UNITED STATES PATENT AND TRADEMARK OFFICE
CERTIFICATE OF CORRECTION

PATENT NO. : 10,408,625 B2
APPLICATION NO. : 15/132860
DATED : September 10, 2019
INVENTOR(S) : Christopher P. Lee Page 1 of 1

It is certified that error appears in the above-identified patent and that said Letters Patent is hereby corrected as shown below:

On the Title Page

Item (56), references cited, other publications, cite no: 1, delete:
"Hillary Bruebeck, "Watch Nissan's New Self-Driving Office Chair in Action"; Fortune.com; http://fortune.com/2015/02/17/nissan-self-driving-chair/; dated Feb. 17, 2016; accessed Apr. 26, 2016."
And insert:
--Hillary Bruebeck, "Watch Nissan's New Self-Driving Office Chair in Action"; Fortune.com; http://fortune.com/2016/02/17/nissan-self-driving-chair/; dated Feb. 17, 2016; accessed Apr. 26, 2016.-- therefor.

Signed and Sealed this
Fifth Day of November, 2019

Andrei Iancu
*Director of the United States Patent and Trademark Office*